United States Patent [19]

Yamada et al.

[11] Patent Number: 5,063,508
[45] Date of Patent: Nov. 5, 1991

[54] TRANSLATION SYSTEM WITH OPTICAL READING MEANS INCLUDING A MOVEABLE READ HEAD

[75] Inventors: Yoshimi Yamada; Kazuo Ito; Hideo Tanimoto, all of Tokyo, Japan

[73] Assignee: Oki Electric Industry Co., Ltd., Tokyo, Japan

[21] Appl. No.: 496,192

[22] Filed: Mar. 14, 1990

[30] Foreign Application Priority Data

Mar. 22, 1989 [JP] Japan ................................ 1-69930

[51] Int. Cl.⁵ ............................................. G06K 9/00
[52] U.S. Cl. .................................... 364/419; 235/472; 382/59
[58] Field of Search ...................... 235/472, 454, 475; 360/101; 382/59, 13, 65, 68, 419

[56] References Cited

U.S. PATENT DOCUMENTS

| | | | |
|---|---|---|---|
| 4,553,035 | 11/1985 | Malinsky et al. | 235/472 |
| 4,677,683 | 6/1987 | Pferd, III et al. | 382/65 |
| 4,860,377 | 8/1989 | Ishigaki | 235/472 |
| 4,890,230 | 12/1989 | Tanoshima et al. | 382/59 |
| 4,930,848 | 6/1990 | Knowles | 235/472 |
| 4,953,225 | 8/1990 | Togawa et al. | 382/59 |

Primary Examiner—Gail O. Hayes

[57] ABSTRACT

A portable electronic dictionary capable of translating an objective word in a source language into an equivalent in a target language. A read unit provided in a portion of a case is surrounded by transparent walls. In reading the objective word, the electronic dictionary is held stationary on the document with the read unit located on the objective word, the pushbutton of a start switch is depressed to actuate an optical character scanning head for scanning, and then the optical character scanning head moves within the read unit to scan the characters of the objective word.

8 Claims, 6 Drawing Sheets

Fig. 7

| ENGLISH WORD | ADDRESS |
|---|---|
| a | 0001 |
| abandan | 0002 |
| ⋮ | ⋮ |
| dictionary | 0050 |
| ⋮ | ⋮ |
| family | 0120 |

| ADDRESS | |
|---|---|
| ------ | ------ |
| ------ | ------ |
| 0050 | dictionary |
| 0051 | [díkʃənèri] |
|  | n.1 辞典, 辞書, 字引き |
|  | 用語辞典 |
|  | a ~ of English |
|  | 英語辞典 |
|  | consult a ~ |
|  | 辞書を引く |
|  | n2 特殊辞典, 事典 |
|  | a .biographical ~ |
| 0060 | 人名辞典 |
| 0061 | * |
|  | ------ |
| 0120 | family |
| 0121 | [fǽmali] |
|  | n.1 家族 |
|  | ------ |
|  | ------ |

Fig. 8

```
dictionary
[díkʃənèri]
n.1 辞典, 辞書, 字引き, 用語辞
典: a ~ of English 英語辞典
consult a ~ 辞書を引く n.2
特殊辞典, 事典: a biographica
```

TRANSLATION SYSTEM WITH OPTICAL READING MEANS INCLUDING A MOVEABLE READ HEAD

BACKGROUND OF THE INVENTION

This invention concerns an electronic dictionary which provides, for words or compound words of one language that is, objective words in a saurce language), the equivalents in another language (a target language).

So-called electronic dictionaries have become commercially available. Such electronic dictionaries require key-input of, for example, an English word or compound word (herafter the term "word" will be used generically, so as to encompass a compound word and then display information in, for example, Japanese, The displayed information typically includes the equivalent word or compound word, meaning and pronunciation.

Such an electronic dictionary, however, requires an alphabetical keyboard to enter a word of the source language, which is liable to entail errors due to incorrect operation of the keyboard or misreading of the word, particularly if the operator operates the keyboard and reads the source document alternately. Each time an input error is made, the word must be reentered. Thus, entering a word correctly takes a significant amount of time, which, in some cases, is longer than the time necessary for consulting an ordinary dictionary. Thus, the conventional electronic dictionaries have been far from being practical, and they have not been able to exhibit the full advantages of the electronic dictionary.

The assignee of the present application proposed an electronic dictionary in U.S. patent application Ser. No. 07/135,525, now U.S. Pat. No. 4,890,230.

This electronic dictionary is provided with optical character reading means for entering a word of a source language, namely, an objective word. In entering the objective word, the optical character reading means is applied to the first character of the objective word, and then moved along the objective word by hand to read the word. Characters of the objective word are coverted into corresponding electric signals, the characters are identified one at a time, and the objective word is identified by the arrangement of the characters. The objective word and the equivalents in the target language are displayed simultaneously on a display.

This electronic dictionary facilitated the entry of an objective word considerably and reduced the possibility of misreading. Nevertheless, it sometimes happened that the objective word could not be identified or that the objective word was incorrectly identified due to the meandering scanning movement of the optical character reading means or irregular scanning speed. When the objective word cannot be identified is identified erroneously, the optical character reading means must be operated again for scanning. Thus, even this electronic dictionary is not completely free from troublesome operation.

SUMMARY OF THE INVENTION

Accordingly, it is an object of the present invention to simplify the operation for entering an objective word.

It is another object of the present invention read an objective word with an optical character reading means without requiring manual operation.

It is a further object of the present invention to provide an electronic dictionary which has an optical character reading means and which is capable of correctly identifying an objective word.

It is still a further object of the present invention to provide a portable electronic dictionary incorporating the foregoing improvements.

To achieve the objects, the present invention provides an electronic dictionary comprising a hand case, a read unit to be disposed over an objective word, contained in the hand case, a carriage, a photoelectric scanning head mounted on the carriage to illuminate an objective word and to convert the objective word into electric signals, guide means for guiding the carriage for movement along a predetermined direction within the read unit, carriage driving means for reciprocating the carriage in predetermined directions within a predetermined range, and a translation circuit which provides language information in a target language equivalent to the objective word. A display for displaying both the objective word and the equivalent language information in the target language is provided on the surface of the hand case, and a start switch to give a translation start command commanding the scanning of the objective word is provided on the hand case.

In using the electronic dictionary of the present invention, the electronic dictionary is placed on a document with the read unit located on an objective word, and then the pushbutton of the start switch is depressed. Consequently, the carriage moves within the read unit, and the photoelectric scanning head scans the objective word for reading. The translation circuit identifies characters constituting the objective word by the output signals of the photoelectric scanning head, and displays the equivalent word in a target language on the display. Thus, the operator is able to find the equivalent in the target language for the objective word simply by placing the electronic dictionary so that the read unit is located on the objective word and depressing the pushbutton of the start switch.

The above and other objects, features and advantages of the present invention will become more apparent from the following description taken in conjunction with the accompanying drawings.

BRIEF DESCRIPTION OF THE DRAWINGS

FIG. 7 is an illustration of assistance in explaining a word library and a dictionary storage; and FIG. 8 is an example of information shown on a display incorporated into the electronic dictionary embodying the present invention.

DETAILED DESCRIPTION OF THE EMBODIMENTS

Figure 1:
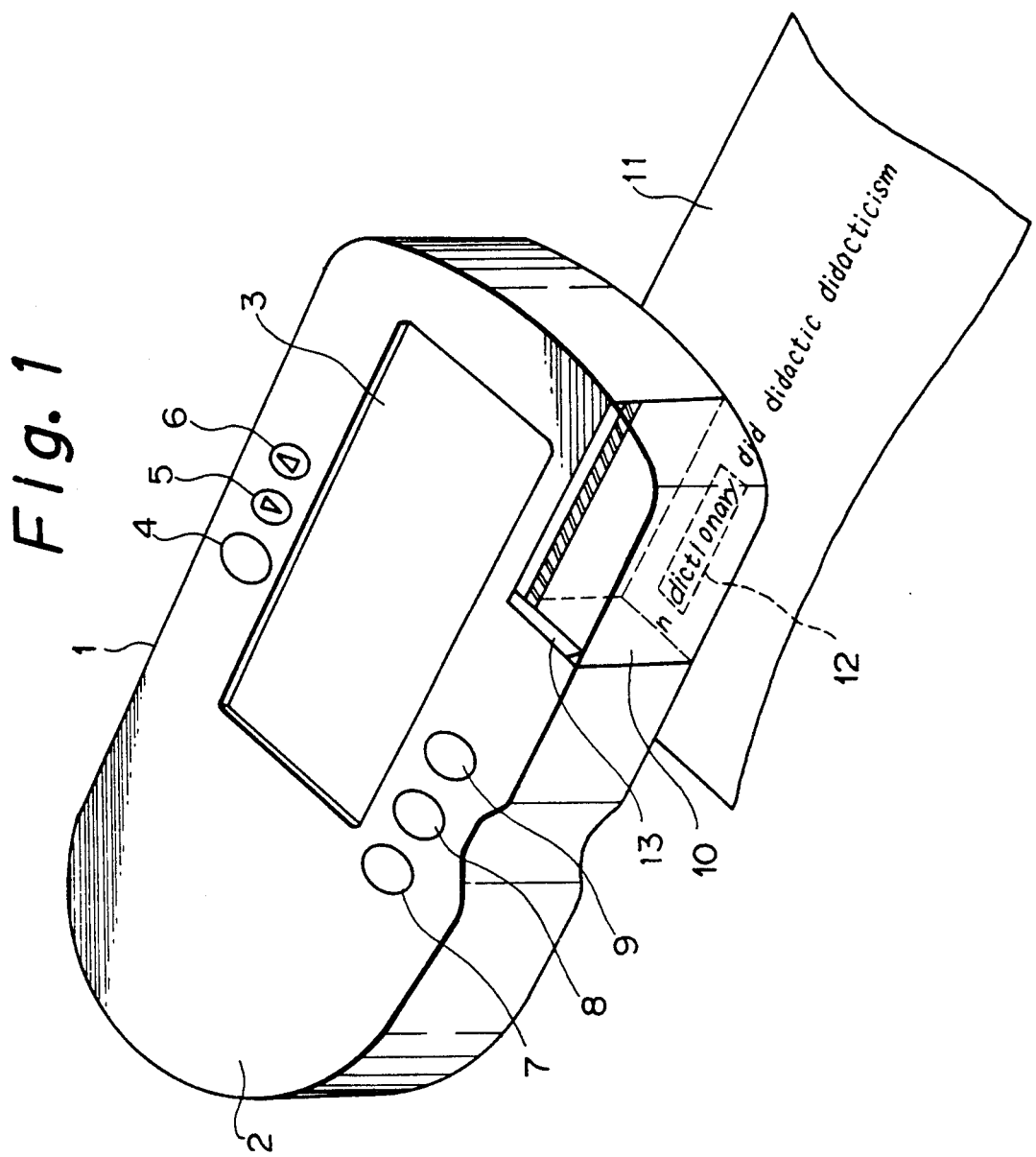
FIG. 1 is a perspective view of an electronic dictionary in a preferred embodiment according to the present invention, the electronic dictionary being shown in use.

FIG. 1 shows an external view of an electronic dictionary 1 embodying the present invention in use. The electronic dictionary 1 comprises a hand case 2 provided on its upper wall with a display 3 and control switches 4, 5, 6, 7, 8 and 9. A read unit 10 is provided in a portion of the hand case 2. The upper side, lower side, front side, and right side of the read unit 10 are defined by transparent plates to enable an operator to view a document 11 placed under the lower side from a position above the read unit 10 or from an upper right-hand position with respect to the read unit 10.

In use, the electronic dictionary is placed on a document so that the read unit 10 is located on an objective word. A read frame 12 defining a reading area is printed on the trasparent bottom plate of the read unit 10 to facilitate positioning the read unit 10 on the objective word. After the electronic dictionary has correctly been placed on the document with the objective word enclosed in the read frame 12, the pushbutton of the start switch 4 is depressed to start the translation. Then a carriage 13 moves within the read unit 10.

Figure 2:
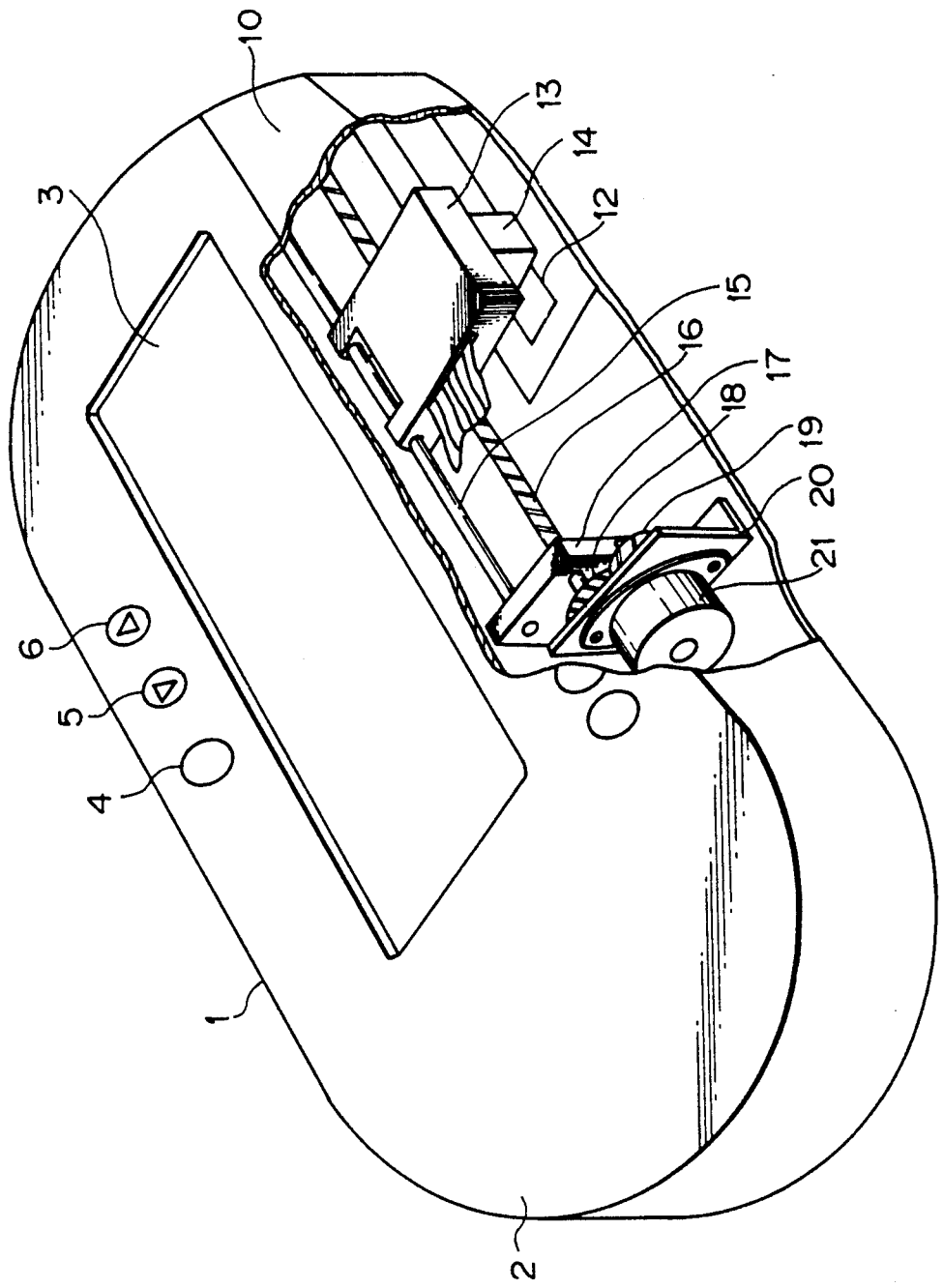
FIG. 2 is a partially cutaway perspective view of the electronic dictionary embodying the present invention.
Figure 4:
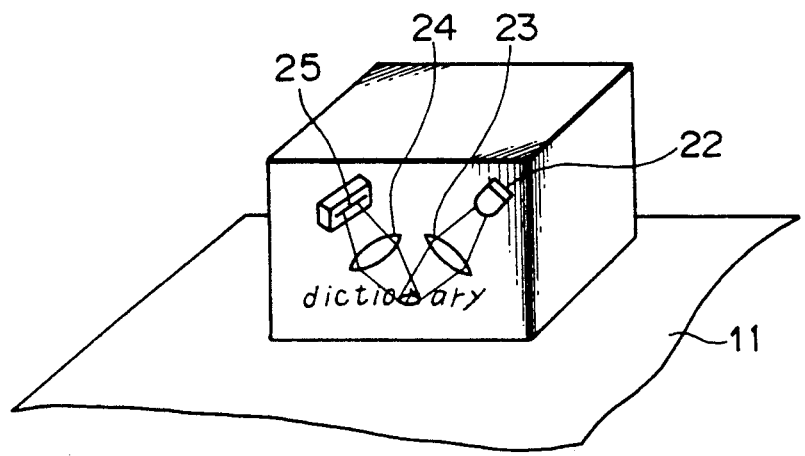
FIG. 4 is a perspective view showing the internal configuration of a photoelectric scanning head incorporated into the electronic dictionary embodying the present invention.

FIG. 2 shows a photoelectric scanning head moving mechanism provided within the read unit 10. A photoelectric scanning head 14 is attached to the carriage 13 so as to face downward. The carriage is supported on a guide shaft 15 for sliding movement along the guide shaft 15. The carriage 13 is moved by a screw rod 16 extending parallel to the guide shaft 15. The screw rod 16 is provided externally with a screw thread. A lower part of the carriage 13 engages the screw thread of the screw rod 16. The screw rod 16 is rotated to move the carriage 13. The guide shaft 15 is fastened at its opposite ends to a side plate 17 and another side plate, not shown. The screw rod 16 is journaled on the two side plates, and a gear 18 is fixed to one end of the screw rod 16. The gear 18 is in engagement with a gear 19 fixed to a rotor shaft of a pulse motor 21 held on a plate 20. When the pulse motor 21 operates, the screw rod 16 is rotated through the gears 18 and 19 by the pulse motor 21. The carriage 13 advances to the right when the rotor shaft of the pulse motor 21 rotates in one direction, and to the left when the same rotates in the opposite direction. As the carriage 13 is moved within the read unit 10, the photoelectric scanning head 14 scans the space within the read frame 12. FIG. 4 shows the internal construction of the photoelectric scanning head 14. The document 11 is illuminated by light emitted by a light source 22, such as a light emitting diode, and focused by a focusing lens 23. The light reflected by the document 11 and focused by a focusing lens 24 falls on a plurality of photoelectric cells arrays 25. The number of the photoelectric cell arrays 25 is large enough to cover the height of the characters.

Figure 3:
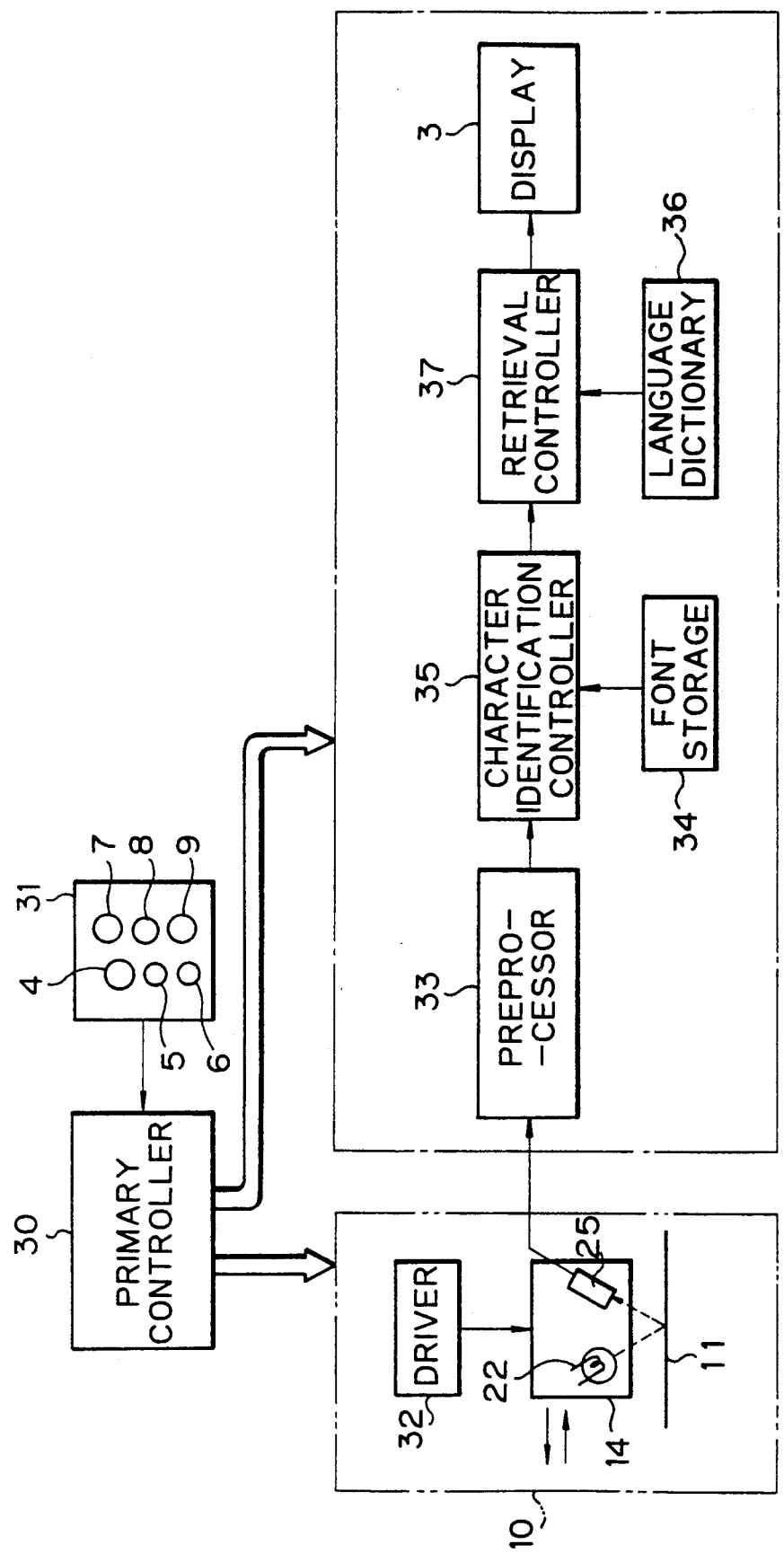
FIG. 3 is a block diagram of assistance in explaining the control system of the electronic dictionary embodying the present invention.

FIG. 3 shows the general construction of a control circuit incorporated into the electronic dictionary. A primary controller 30 comprises a microcomputer, memory and the like and controls generally the functions of the electronic dictionary. An operating unit 31 comprises a switch input circuit for the control switches 4, 5, 6, 7, 8 and 9. A driver 32 of the read unit 10 comprises a driving circuit in the form of a large-scale integrated circuit. Upon the reception of light, the photoelectric cell arrays 25 generate electric signals corresponding to the density distribution in a monochromatic pattern on the document 11.

Figure 6:
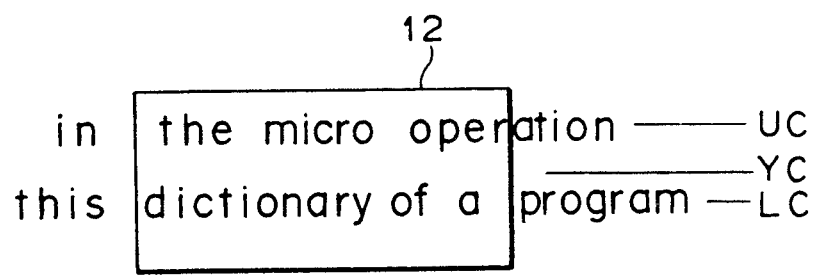
FIG. 6 is an illustration of assistance in explaining the positional relation between the read frame of the read unit of the electronic dictionary and an objective word.

A preprocessor 33 converts analog signals provided by the photoelectric scanning head 14 into corresponding digital signals, subjects the digital signals to smoothing and noise filtration, and executes line selection and word selection. The term "line selection" means the selection of a line nearest to the middle of the read frame 12 with respect to the height of the read frame 12. Referring to FIG. 6, which shows the read frame 12, the distance between the center line YC of the read frame 12 and the center line UC of an upper line is compared to the distance between the center line YC of the read frame 12 and the center line LC of a lower line, and the line whose center line is nearer to the center line YC of the read frame is selected. The term "word selection" means the selection of a portion of the selected line as a word through the detection of blank spaces at the opposite ends of the word. Referring back to FIG. 3, a standard alphabetical font for identifying alphabetical characters is stored in a font storage 34. A character identification controller 35 identifies alphabetical characters and the like represented by the digital signals with reference to the standard alphabetical font stored in the font storage 34. Characters may be identified by a pattern matching method which stores two-dimensional images beforehand in a storage, and compares a character represented by the digital signals with the two-dimensional images for identification, or by a structural analysis method which extracts and stores fragments of characters beforehand and compares the fragments with an input pattern for identification.

The present invention will be described hereinafter as applied to translating an English word as an objective word into Japanese. A language dictionary 36 contains Japanese words corresponding to English words along with information about their forms, meanings, pronunciations, related grammer, examples of sentences, synonyms and antonyms. A retrieval controller 37 retrieves, from the language dictionary 36, a Japanese word corresponding to the English word read by the read unit. The display 3 displays the Japanese word retrieved from the language dictionary 36 by the retrieval controller 37 along with information about the Japanese word.

The operator places the electronic dictionary 1 on the document 11 so that the objective English word, i.e., the word "dictionary" in FIG. 6, is contained in the read frame 12 of the read unit 10. Then, the pushbutton of the start switch 4 is depressed to give a start signal to the primary controller 30, and then the primary controller 30 sends a driving signal to the drive unit 32. The drive unit 32 drives the pulse motor 21 in a predetermined direction through a predetermined angle at a constant rate to move the carriage 13. Then, the photoelectric scanning head 14 scans the English word contained in the read frame 12 to read the characters of the English word. The preprocessor 33 converts the electric signals provided by the photoelectric scanning head 14 into binary signals, selects the line and the objective English word, and gives the binary signals representing the characters of the objective English word to the character identification controller 35. In the example shown in FIG. 7, the line including the word "dictionary" is selected, and the word "dictionary" separated by a space from the following word is selected.

The character identifying controller 35 identifies the characters of the selected word by a pattern matching method using the standard alphabetical font stored in the font storage 34, and gives an English word code representing the objective English word consisting of the identified characters to the retrieval controller 37.

Then, the retrieval controller 37 searches an address memory of the language dictionary 36 for an address code for the identified English word. In searching the address memory of the language dictionary 36, a query is made to see if the code representing the identified English word coincides with the first code in the address memory. If the response is negative, the query is repeated for the following codes until an code coinciding with the code representing the identified English word is found. Upon the coincidence of the code in the address memory of the language dictionary 36 with that of the identified English word, the retrieval controller retrieves the address code.

The operation of the retrieval controller 37 will be described concretely with reference to FIG. 7. In this example, the identified English word is "dictionary", and an address code "0050" is retrieved. Then, the retrieval controller 37 transfers the contents of storage locations in a language memory specified by addresses including a top address specified by the address code retrieved from the address memory, namely, information in Japanese about the identified English word, to the buffer of the display 3. Then, as shown in FIG. 8 the display 3 displays the information in Japanese.

Thus, the electronic dictionary reads the objective English word through the scanning operation of the photoelectric scanning head 14 of the read unit 10, and hence the scanning operation is carried out more stably along a fixed scanning direction and at a constant scanning speed as compared with the manual scanning operation using optical character reading means, so that ratio of successful word identification is increased.

Figure 5:
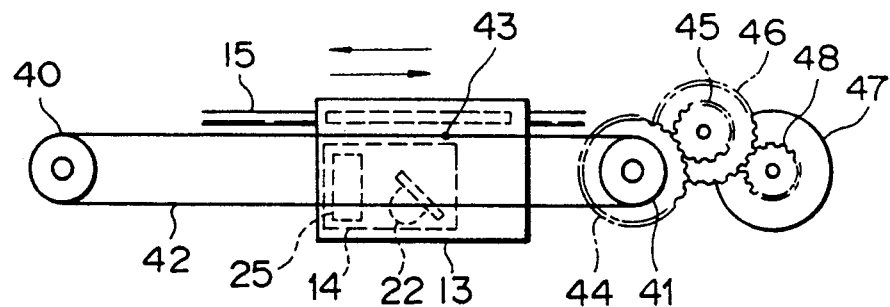
FIG. 5 is a modification of a mechanism for moving the photoelectric scanning head of the electronic dictionary of FIG. 2.

FIG. 5 shows a modification of the driving mechanism for moving the photoelectric scanning head 14. Referring to FIG. 5, a carriage 13 mounted with the photoelectric scanning head 14 is supported, similarly to the carriage 13 shown in FIG. 3, on a guide shaft 15 for movement along the same. An endless belt 42, such as a wire belt, extends between a pair of pulleys 40 and 41 and is fastened at 43 to the carriage 13 to move the carriage 13 to the right or to the left. The pulley 41 is fixed to a shaft on which a gear 44 engaging a gear 45 is mounted fixedly. A gear 46 coaxial with the gear 45 engages a gear 48 fixed to the rotor shaft of a pulse motor 47. When the pushbutton of the start switch 4 of the electronic dictionary 1 is depressed, the rotor shaft of the pulse motor 47 rotates in a predetermined direction through a predetermined angle, and the rotation of the rotor shaft of the pulse motor 47 is transmitted through the gear 48, 46, 45 and 44 to the pulley 41 to drive the photoelectric scanning head 14 for scanning an objective word. Upon the arrival of the end of scanning range, the pulse motor 47 is reversed to return the photoelectric scanning head 14 to its home position. Thus, the pulse motor 47 is driven for rotation in the normal direction through a predetermined angle and then in the reverse direction through the same angle to reciprocate the photoelectric scanning head 14 within the scanning range. At the home position, the photoelectric scanning head 14 conceals itself in the interior of the read unit 10 within the hand case 2 to secure a sufficient field of view for the operator when the read unit 10 is located on the objective word.

Although the invention has been described in its preferred form with a certain degree of particularity, it is to be understood that many variations and changes are possible in the invention without departing from the scope thereof.

What is claimed is:

1. A portable electronic dictionary which reads an objective word in a source language by optical scanning and displays information in a target language about the objective word, comprising:
   a case;
   optical character reading means, having a read range, for optically scanning the objective word on a document while the case is held stationary on the document with the objective word located within the read range of the optical character reading means, the optical character reading means being movably mounted with the case; and
   moving means for moving the optical character reading means inside the case.

2. A portable electronic dictionary according to claim 1, wherein the case includes transparent plates so as to enable an operator to see characters on the document through the read unit, and wherein the optical character reading means comprises a scanning head which is movable adjacent the transparent plates.

3. A portable electronic dictionary according to claim 2, wherein the transparent plates include a lower plate having a mark defining a scanning range for the scanning head.

4. A portable electronic dictionary according to claim 2, wherein the moving means comprises means for reciprocating the read head within the case for scanning the objective word.

5. A portable electronic dictionary according to claim 4, wherein the moving means comprises means for retracting the scanning head from the transparent plates during a standby period through the read unit.

6. A portable electronic dictionary according to claim 5, further comprising means for actuating the carriage driving means to drive the carriage means when a pushbutton of the start switch is manually depressed to start a translation cycle.

7. A portable electronic dictionary according to claim 2, wherein the case has a pair of ends, and the transparent plates are disposed at either end of the case.

8. A portable electronic dictionary for obtaining information in a target language about an objective word in a source language, the objective word being depicted on a document, comprising:
   a hand case having a transparent portion allowing an operator to observe the objective word therethrough when the transparent portion is manually located on the document over the objective word,
   a light source within the case which illuminates the objective word on the document,
   optical character scanning head means within the case for converting the light reflected by the document into electric signals,
   carriage means within the case for carrying the optical character scanning head means,
   guide means within the case for guiding the carriage means for movement along a path which extends within the transparent portion of the case,
   carriage driving means within the case for reciprocating the carriage means along the guide means, translation circuit means for providing information in the target language about the objective word on the basis of signals from the optical character scanning head means, display unit means for displaying the information in the target language about the word in the source language, the display unit means being provided on an upper wall of the case, and a start switch to start a translation cycle, the start switch being provided on the upper wall of the case.

* * * * *